J. G. BISHOP.
HORSE HAY-RAKES.
No. 194,643. Patented Aug. 28, 1877.
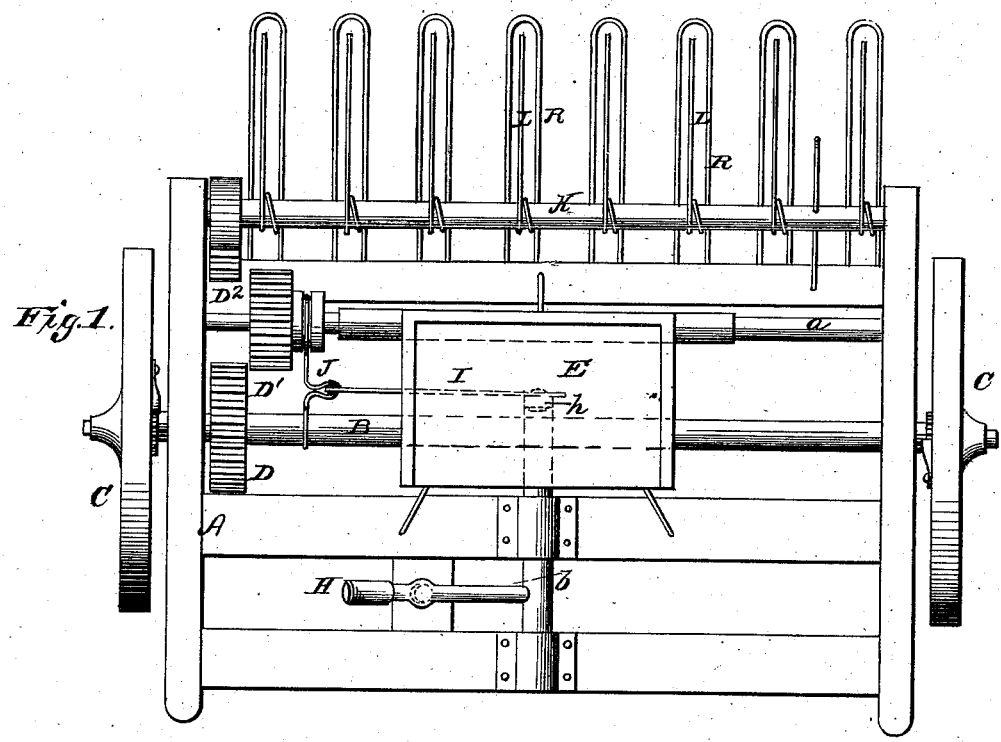
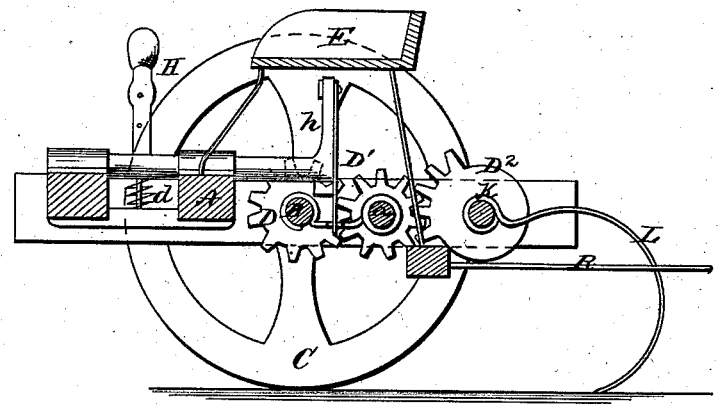

UNITED STATES PATENT OFFICE.

JOHN G. BISHOP, OF CICERO, INDIANA.

IMPROVEMENT IN HORSE HAY-RAKES.

Specification forming part of Letters Patent No. 194,643, dated August 28, 1877; application filed June 26, 1877.

*To all whom it may concern:*

Be it known that I, JOHN G. BISHOP, of Cicero, in the county of Hamilton, and in the State of Indiana, have invented certain new and useful Improvements in Hay-Rakes; and do hereby declare that the following is a full, clear, and exact description thereof, reference being had to the accompanying drawings, and to the letters of reference marked thereon, making a part of this specification.

The nature of my invention consists in the construction and arrangement of a hay-rake, in which the rake may be raised by the power that draws the entire hay-rake, as will be hereinafter more fully set forth.

In order to enable others skilled in the art to which my invention appertains to make and use the same, I will now proceed to describe its construction and operation, referring to the annexed drawings, in which—

Figure 1 is a plan view of my hay-rake, and Fig. 2 is a transverse vertical section of the same.

A represents the frame of my hay-rake, provided with suitable boxes in which the axle B is placed. C C are the wheels placed on the ends of the axle, and connected thereto by pawl and ratchet devices, so that the forward motion of the wheels will turn the axle.

On the axle B, just inside of the frame, is secured a cog-wheel, D, as shown. Back of the axle is a rod, $a$, on which is placed a sliding cog-wheel, $D^1$, and then upon the rake-head K is secured a quarter cog-wheel, $D^2$.

The driver's seat E is just over the axle, and in front of the same is a foot-lever, H, attached to a rocking shaft, $b$, and held in an elevated or raised position by a spiral spring, $d$, underneath. On the rear end of the rocking shaft $b$ is an arm, $h$, connected by a lever, I, to the sliding cog-wheel $D^1$.

The lever may be connected directly to the cog-wheel by having its end forked and straddling a circumferential groove in the hub of said cog-wheel; or it can be done indirectly by attaching the lever to a slide, J, which moves on the axle, and has a fork or eye placed around the hub of the cog-wheel.

By the driver placing his foot on the foot-lever H the sliding cog-wheel $D^1$ is thrown in gear with the wheel D and segment $D^2$, and as the vehicle moves forward the rake-head is thereby turned on its journals, and the rake-teeth raised above the cleaning-rods.

K is the rake-head journaled in the frame, and L L are the teeth projecting therefrom.

When the foot is removed from the lever H the spring $d$ throws the same upward, whereby the cog-wheel $D^1$ is thrown out of gear, and the rake then falls to the ground, ready to gather hay again.

The cleaning-rods R R are attached to a bar just behind the rake-head, and are made of wire bent double in the form of loops, with the ends fastened to the frame, as shown, and with the rake-teeth L passing through them, so that as the rake-teeth pass upward in raising the rake, the rods will rake the hay from said teeth.

The rake-teeth L are bolted in the rake-head K and bent several times around said head, making a spring at that point, allowing the teeth to give whenever they meet any stubborn resistance.

Having thus fully described my invention, what I claim as new, and desire to secure by Letters Patent, is—

1. The combination, in a horse hay-rake, of the axle B, the cog-wheel D, the rake-head K, with cogged segment $D^2$, the laterally-movable cog-wheel $D^1$, slide J, lever I, shaft $b$, with arm $h$, and foot-lever H, and the spring $d$, all constructed and arranged to operate substantially as and for the purposes herein set forth.

2. The clearing-rods R R, each made of a single piece of wire bent double, the ends being fastened to the frame, and the rake-teeth passing through them, as set forth.

In testimony that I claim the foregoing I have hereunto set my hand this 3d day of June, 1877.

JOHN G. BISHOP.

Witnesses:
 FRANK GALT,
 G. W. BISHOP.